J. J. HAYES.
CHANGE SPEED GEARING.
APPLICATION FILED MAY 16, 1911.

1,020,418.

Patented Mar. 19, 1912.

Witnesses

Inventor
J. J. Hayes

By
Attorneys.

COLUMBIA PLANOGRAPH CO., WASHINGTON, D. C.

UNITED STATES PATENT OFFICE.

JERRY J. HAYES, OF ELKHART, INDIANA.

CHANGE-SPEED GEARING.

1,020,418.  Specification of Letters Patent.  Patented Mar. 19, 1912.

Application filed May 16, 1911. Serial No. 627,491.

*To all whom it may concern:*

Be it known that I, JERRY J. HAYES, citizen of the United States, residing at Elkhart, in the county of Elkhart and State of Indiana, have invented certain new and useful Improvements in Change-Speed Gearing, of which the following is a specification.

This invention relates to a change speed gearing especially adapted for convertible churns and freezers, and has for its object to provide a mechanism which may be readily adjusted when the structure is transformed as indicated. With this object in view the structure includes a platform upon which is mounted a frame, and upon the said frame is adjustably mounted a bracket carrying a shaft provided with a crank handle and beveled gear wheel. A shaft is journaled in the frame and is provided at its upper end with a gear wheel having two sets of teeth, one of greater diameter than the other and nested one within the other. The gear wheel upon the first mentioned shaft is adapted to be placed in mesh with either set of teeth upon the last mentioned gear wheel, so that by rotating the first mentioned shaft at a constant rate of speed the last mentioned shaft may be rotated at fast or slow speed. A body is mounted upon the platform within the frame and is held in position by clamping devices, and a set of paddles or a dasher is operatively connected with the said shaft and is arranged to rotate within the body.

Figure 1:
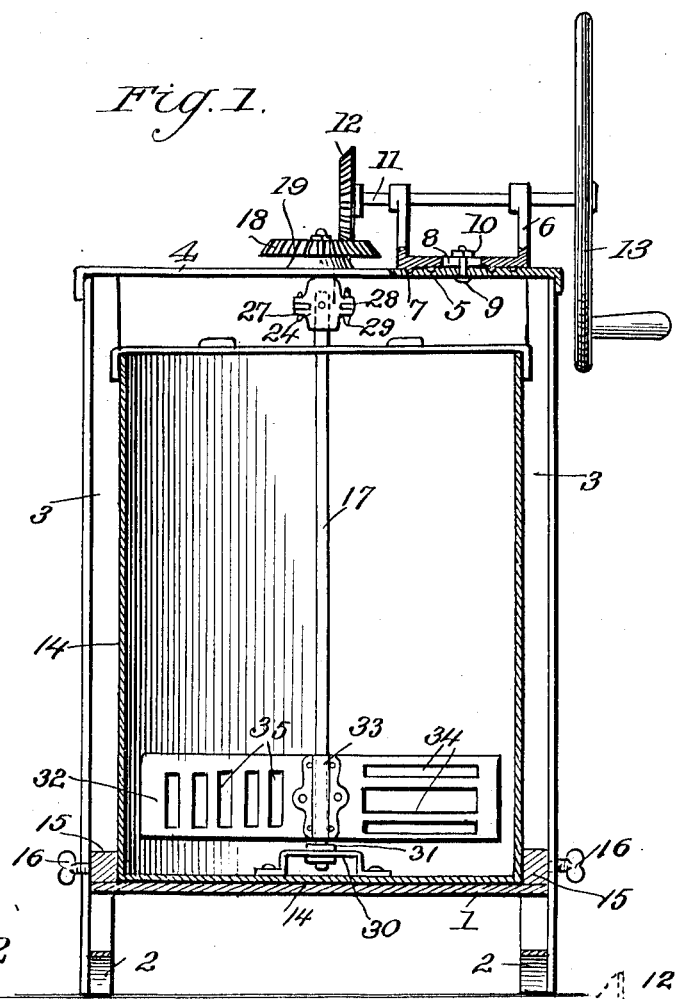
Figure 2:
Figure 3:
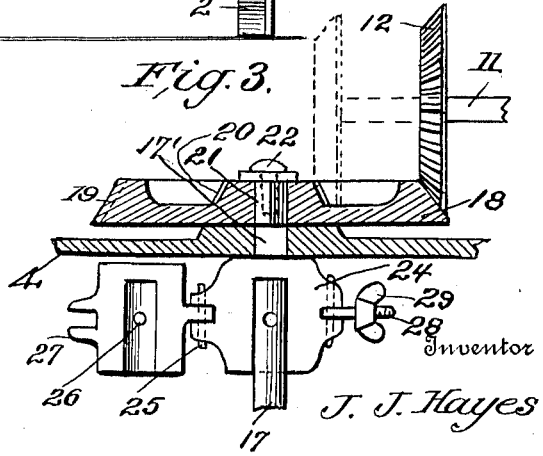

For a full understanding of the invention reference is to be had to the following description and accompanying drawings, in which:

Figure 1 is a vertical sectional view of the structure with the parts arranged as a churn; Fig. 2 is a plan view of the gear wheel having the duplicate set of teeth; Fig. 3 is a vertical sectional view of the said wheel showing adjacent parts.

Corresponding and like parts are referred to in the following description and indicated in all the views of the accompanying drawings by the same reference characters.

The structure includes a platform 1 which is mounted upon supports 2. A frame 3 is mounted upon the platform and includes vertical side standards and a top cross bar 4. This bar is provided at one side with notches 5. A bracket 6 is mounted upon the cross bar 4 and is provided upon its under side with lugs 7 adapted to be seated in the notches 5. The bracket 6 is provided with an elongated slot 8 through which a bolt 9 passes. The said bolt also passes through the cross bar 4. A nut 10 is screw threaded upon the upper end of the bolt 9, and by loosening the said nut the bracket 6 may be shifted longitudinally so that its lugs 7 may be positioned in any of the notches 5 desired. After the said bracket has been positioned the nut 10 is tightened upon the bolt 9, whereby it is secured in its adjusted position. A shaft 11 is journaled in the upper portion of the bracket 6 and is provided at its inner end with a beveled gear wheel 12. A crank handle 13 is fixed to the outer end of the shaft 11.

A body 14 is mounted upon the platform 1 and is located between the vertical standards of the frame 3. The said body may be that of a churn or a freezer or other apparatus. A block 15 is mounted upon the platform 1 and bears against one side of the body 14 and is held in close contact with the body by means of a set screw 16 which passes through one of the standards of the frame 3. Thus means is provided for fixing the said body with relation to the platform 1. A shaft 17' is journaled in the cross bar 4 of the frame 3 and is provided at its upper end with a gear wheel 18 having two sets of gear teeth 19 and 20, the set 19 being of greater diameter than the set 20. A set of teeth 20 is nested within the set of teeth 19. The gear wheel 12 is adapted to be brought into mesh with either of the sets of teeth of the wheel 18, and the object in providing means for shifting the position of the bracket 6 upon the cross bar 4 is to bring the wheel 12 into mesh with either of the sets of teeth of the wheel 18. Thus by rotating the shaft 11 at a constant rate of speed the shaft 17' may be rotated at a fast or slow rate of speed. The wheel 18 is positioned upon the non-circular end 21 of the shaft 17' and is held in place thereon by means of a washer and screw 22 which is tapped in the upper end of the said shaft. Thus the shaft 17' is supported upon the cross bar 4. The shaft 17' is held against upward movement with relation to the cross bar by means of a collar 23 carried by the shaft just below the said bar. This collar consists of mated halves 24 hingedly connected together as at 25 and provided with points 26 which enter depressions provided in the sides of the shaft 17. One of the halves 24 is provided with spaced lugs 27 and a nut 28 is pivoted to the other half and is adapted to be swung into the space between the lugs 27 when the said halves are closed about the shaft 17. A wing nut 29 is threaded upon the bolt 28 and may be screwed thereon and brought in close contact with the lugs 27, whereby the said halves of the collar 23 are held in fixed position upon the shaft 17.

In the form of the body 14 as illustrated in Fig. 1 of the drawing, the same is provided upon its bottom with a bracket 30 which at its intermediate portion is spaced from the bottom of the body. This bracket carries a bearing 31 which is of wood or other relatively soft material, and the lower end of the shaft 17 is journaled in the said bearing 31 and is held against lateral movement thereby but is not supported by the said bearing 31. The entire weight of the shaft 17 and its attachments is borne by the cross bar 4 of the frame 3.

As shown in Fig. 1 a dasher 32 is mounted upon the lower portion of the shaft 17. The said dasher consists of radially disposed wings attached to the collar 33 which in turn is fixed to the lower portion of the said shaft. One of these wings is provided with elongated horizontally disposed openings 34 and the other wing is provided with elongated vertically disposed openings 35. This structure is especially adapted to be used for churning, and by providing the wings with the openings in the disposition indicated, the said wings more effectually break the body of cream into irregular stratums or strips as the dasher is rotated.

When the apparatus is used as a freezer the bracket 6 is positioned upon the cross bar 4 of the frame 3 so that the wheel 12 is brought in mesh with the set of teeth 19 upon the wheel 18 and thus as the shaft 11 is rotated at a predetermined rate of speed the shaft 17 is rotated at a relatively slow rate of speed.

Having thus described the invention, what is claimed as new is:

1. A device as described comprising a bar provided with notches, a bracket adjustably mounted upon the bar and having lugs adapted to enter the notches, means for securing said bracket in an adjusted position upon the bar, a shaft journaled in the bracket, a gear wheel fixed to the shaft, a shaft journaled in the bar, and a gear wheel fixed to the last mentioned shaft and having two sets of gear teeth of different diameter and nested one within the other, the first mentioned gear wheel adapted to be placed in mesh with either set of teeth upon the last mentioned gear wheel.

2. A device as described comprising a bar having notches, a bracket adjustably mounted upon the bar and having lugs adapted to enter the notches, means for securing the bracket in an adjusted position upon the bar, a shaft journaled in the bracket, a gear wheel carried by the shaft, a shaft journaled in the bar, a gear wheel fixed to the last mentioned shaft and resting upon the bar and supporting the shaft, the last mentioned gear wheel having two sets of gear teeth of different diameter and nested one within the other, the first mentioned gear wheel being adapted to be placed in mesh with either set of teeth upon the last mentioned gear wheel, and a collar carried by the second mentioned shaft and located below the bar.

In testimony whereof, I affix my signature in presence of two witnesses.

JERRY J. HAYES. [L. S.]

Witnesses:
A. L. FLICKER,
FRANK A. SAGE.

---

Copies of this patent may be obtained for five cents each, by addressing the "Commissioner of Patents, Washington, D. C."